Feb. 1, 1966 G. H. RAWCLIFFE 3,233,160
SINGLE-PHASE, POLE-CHANGING MOTOR
Filed Aug. 14, 1962 13 Sheets-Sheet 1

INVENTOR
Gordon Hindle Rawcliffe
BY
Stevens Davis Miller + Mosher
ATTORNEYS

Fig.4.

Fig.5(a)
PARALLEL
UNMODULATED

Fig.5(b)
SERIES
MODULATED

Fig.6(a) PARALLEL MODULATED

PARALLEL UNMODULATED

Fig.6(b)

SERIES MODULATED

Fig. 7(a)
PARALLEL UNMODULATED

Fig. 7(b)
SERIES MODULATED

Fig.8(a) SERIES UNMODULATED

Fig.8(b). PARALLEL MODULATED

Fig. 9(a) PARALLEL UNMODULATED

Fig. 9(b) SERIES MODULATED

Feb. 1, 1966    G. H. RAWCLIFFE    3,233,160
SINGLE-PHASE, POLE-CHANGING MOTOR
Filed Aug. 14, 1962    13 Sheets-Sheet 9

Fig. 10(a)
PARALLEL UNMODULATED

Fig. 10(b)
SERIES MODULATED

INVENTOR
Gordon Hindle Rawcliffe
BY
Stevens Davis Miller & Mosher
ATTORNEYS

G. H. RAWCLIFFE 3,233,160

SINGLE-PHASE, POLE-CHANGING MOTOR

Filed Aug. 14, 1962

INVENTOR

Gordon Hindle Rawcliffe

BY

Stevens, Davis, Miller & Mosher

ATTORNEYS

Feb. 1, 1966 G. H. RAWCLIFFE 3,233,160
SINGLE-PHASE, POLE-CHANGING MOTOR
Filed Aug. 14, 1962 13 Sheets-Sheet 12

Fig. 15.

United States Patent Office 3,233,160
Patented Feb. 1, 1966

3,233,160
SINGLE-PHASE, POLE-CHANGING MOTOR
Gordon Hindle Rawcliffe, Clifton, Bristol, England, assignor to National Research Development Corporation
Filed Aug. 14, 1962, Ser. No. 216,901
Claims priority, application Great Britain, Aug. 31, 1961, 31,320/61
9 Claims. (Cl. 318—224)

This invention relates to pole changing, single-phase alternating current rotary electric machines, particularly pole-changing squirrel cage induction motors, and to the alternating current windings thereof.

Three-phase alternating current machines are known which provide alternative first and second pole-numbers by a method of phase-winding switching known as pole-amplitude modulation.

Several embodiments of such pole-changing three-phase machines have been described in two papers by Professor G. H. Rawcliffe and others, the earlier entitled "Induction Motor Speed-Changing by Pole-Amplitude Modulation" in the Proceedings of the Institution of Electrical Engineers, Volume 105, Part A, Number 22, August 1958, and the latter entitled "Speed-Changing Induction Motors—Further Developments in Pole-Amplitude Modulation" in the Proceedings of the Institution of Electrical Engineers, Volume 107, Part A, Number 36, December, 1960.

Because of the generation also of a third pole-number in each phase-winding and the need to eliminate such third pole-number to permit operation at the second pole-number, it has previously been thought that only three-phase windings or other multiphase windings, could use the pole-changing method of pole-amplitude modulation.

It has now been found that the method can be extended to provide pole-changing, single-phase windings, subject to certain design requirements which are explained in this specification.

The object of this invention, therefore, is to provide single-phase alternating current windings having alternative first and second pole-numbers using the method of pole-amplitude modulation and to provide, by way of example, single-phase, speed-changing induction motors using such a pole-changing stator winding together with a squirrel-cage rotor.

Accordingly, the invention provides a pole-changing single-phase alternating current winding arrangement for a rotary electric machine, comprising two windings for connection together to a single-phase alternating current supply to provide a running field for the machine, each winding being wound for a first pole-number and each winding having winding parts arranged for alternative connection in circuit, according to the method of pole-amplitude modulation, to provide second and third pole-numbers together in each winding considered independently, said winding arrangement further comprising a starting winding for connection to said single-phase alternating current supply through phase-shifting means, to provide a starting field for the machine said two windings being physically disposed for elimination of said third pole-number from the running field.

An induction motor according to the invention conveniently has a stator winding as described in the preceding paragraph in combination with a squirrel-cage rotor.

It is further convenient for the said two windings to be identical with each other and for the starting winding to be identical with both.

In such a winding arrangement, any two of the three windings can then be selected for connection to the single-phase supply and the remaining winding then serves as the starting winding. For convenience, therefore, in the specific description which follows, all three windings are referred to as phase-windings.

In order that the invention may readily be carried into effect, the method of pole-changing by pole-amplitude modulation, suitable phase-winding spacing to eliminate the unwanted modulated pole-number and examples of single-phase, pole-changing induction motors will now be described with reference to the accompanying drawings, in which:

FIGS. 5(a) to 10(b) are corresponding pairs of circuit diagrams showing alternative connections of the coils of a single phase-winding providing alternative unmodulated and modulated M.M.F. waveforms;

Pole-amplitude modulation

FIGS. 1 to 4 are waveform diagrams showing the magnetomotive force distribution of an 8-pole phase-winding. In all the figures, the horizontal axes of the waveform diagrams represents angular distance round the circumference of the phase-winding. Point "O" is taken arbitrarily as the origin of all the waveforms and point "$2\pi$" represents a single revolution around the winding axis. The vertical axis in all diagrams represents M.M.F. amplitude.

Figure 1:
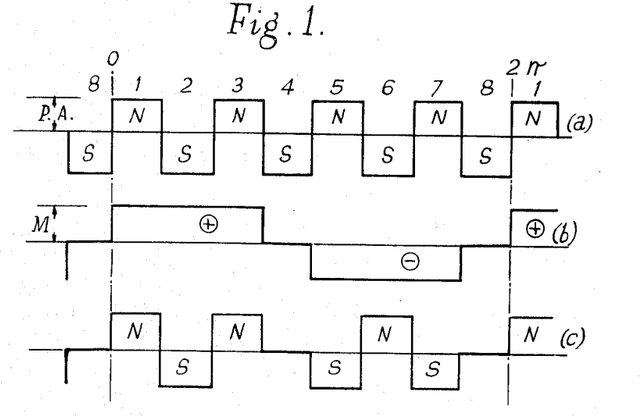
FIGS. 1 to 4 are a series of magnetomotive force waveform diagrams showing four different forms of pole-amplitude modulation, by way of example.

In FIG. 1(a), eight poles of an integral slot winding, of alternating polarity and all of equal pole-amplitude, represented by the arrow "PA," are shown in the full circumferential length of the phase-winding.

FIG. 1(b) shows a modulation wave of cyclic form throughout a single cycle having a positive value of unity, represented by the arrow "M," extending for three poles of the waveform of FIG. 1(a) and a value zero extending for one pole length to the half-circumference point of the phase-winding. For the second half of the circumferential length, the shape of the modulation wave is repeated in negative sense. A portion having the negative value of unity extends for three pole lengths and finally a portion of zero amplitude extends for the last pole.

The modulation of pole-amplitude represented by the waveform of FIG. 1(b) is obtained by leaving unchanged the part of the phase-winding providing the three poles within the positive part of the modulation wave.

Where the modulation wave is zero, for the 4th and 8th poles, the corresponding part of the phase-winding is omitted from circuit. Alternatively, the two coils, or the two coil groups, of the phase-winding which provide the 4th and the 8th pole may each be wound in two equal parts serially connected in aiding relationship to provide the waveform of FIG. 1(a). For modulation, the two parts are connected serially in opposition, so that the field of the one part cancels the field of the other part. The resultant pole amplitude is then substantially zero.

Where the modulation wave is negative, for the 5th through 7th poles, the corresponding phase-winding part is reversed in circuit to provide the opposite sense of current flow therein from the phase-winding part corresponding to the 1st, 2nd and 3rd poles.

The connection of phase-winding parts which remain energised in the modulated connection is defined in this way, in terms of the relative sense of current flow in the two parts, because the sense of connection to the A.C. supply circuit of the A.C. winding as a whole is also dependent upon the sense of rotation required for the machine. This matter is explained later herein.

The resultant modulated M.M.F. waveform is shown in FIG. 1(c). It will be seen that poles 1, 2 and 3 remain unchanged, poles 5, 6 and 7 are reversed in polarity but remain of the same amplitude and poles 4 and 8 are reduced to zero amplitude.

This modulated M.M.F. waveform of FIG. 1(c) represents the resultant of two separate component waveforms, one of 10-poles and the other of 6-poles.

This fact, which is readily proved by mathematical analysis of the modulation operation as well as by the practical operation of the invention, is one of the principles upon which this invention is based. It provides the first step in the pole-changing method by which two new pole-numbers are created. The elimination of the unwanted modulated pole-number is dealt with later.

Figure 5A:
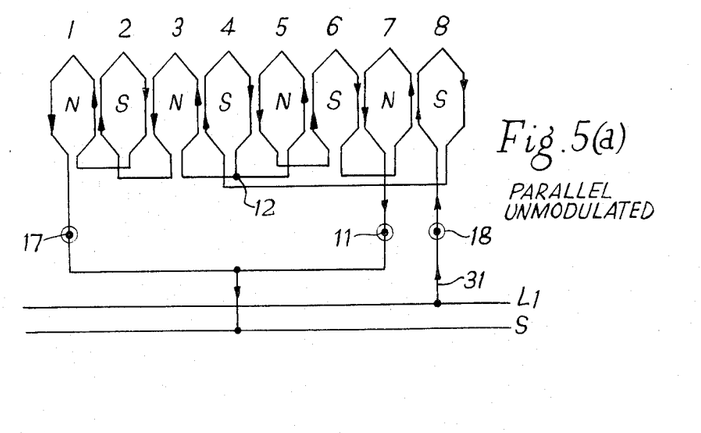
Figure 5B:
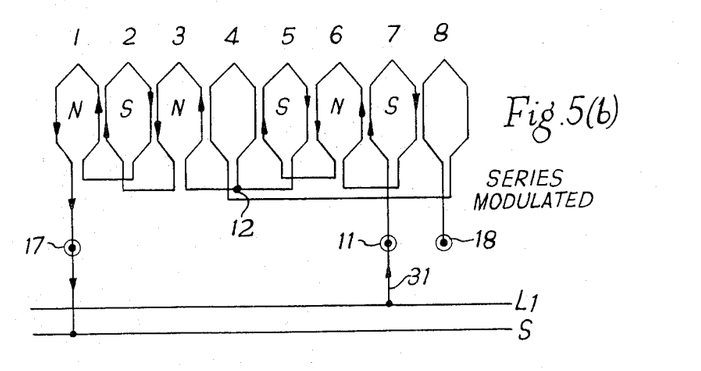

Reference is now made to FIG. 5(a) and FIG. 5(b) which are conventional circuit diagrams showing an 8-pole integral-slot phase-winding in parallel unmodulated connection and series modulated connection, respectively. For clarity, each coil, or coil group, of the winding is shown as a single loop. Each loop is numbered according to the number of the pole produced thereby.

Figure 6A:
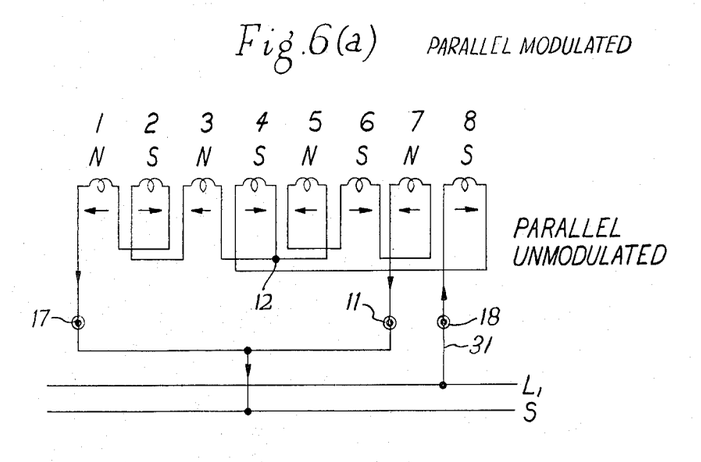
Figure 6B:
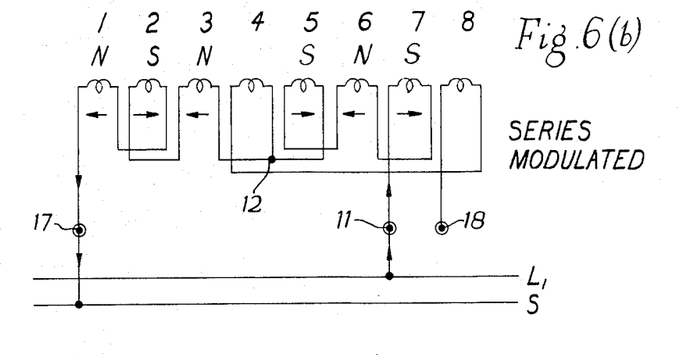

Reference is concurrently made to FIG. 6(a) and and FIG. 6(b) showing the same phase-winding as FIGS. 5(a) and 5(b), in the same alternative connections respectively, the coils are coil groups, being represented in a different schematic form. This different schematic form is clearer for describing the more complicated phase-winding arrangements of FIG. 7 to 10.

In FIGS. 5(a), 5(b), 6(a) and 6(b), coils 1, 2 and 3 are serially connected between terminals 17 and 12. Coils 5, 6 and 7 are serially connected between terminals 12 and 11. Coils 4 and 8 are serially connected in a separate branch betwen terminals 12 and 18.

In FIGS. 5(a) and 6(a), terminal 18 is connected to phase line $L_1$ by connection 31. Terminals 11 and 17 are both connected to line S or star centre point. This connection provides current flow through the phase-winding in the direction of the arrows shown, the two major parts of the phase-winding being connected in parallel.

It will be seen that this connection provides the M.M.F. waveform of FIG. 1(a).

In FIGS. 5(b) and 6(b), terminal 17 remains connected to line S, terminal 11 is connected to line $L_1$ by conductor 31 and terminal 18 is isolated. The two major parts of the phase-winding are now connected in series and the minor part is omitted from circuit.

It will be seen that this series connection provides the waveform of FIG. 1(c), that is to say, reconnection of the phase-winding parts has applied the modulation wave of FIG. 1(b) to the original M.M.F. waveform of FIG. 1(a). Coils 1, 2 and 3 remain unchanged in circuit, thus poles 1, 2 and 3 remain unchanged in polarity. Reversal of polarity of poles 5, 6 and 7 is effected by reversing the sense of current flow in coils 5, 6 and 7 relatively to the sense of flow in coils 1, 2 and 3. Reduction of poles 4 and 8 to zero amplitude is effected by omitting coils 4 and 8 from circuit.

Assuming, in this example, that each pole is created by a single coil group, it is convenient to represent this winding in its unmodulated connection by the notation:

$$+1, +1, +1, +1, \quad +1, +1, +1, +1,$$

and in the modulated connection thus:

$$+1, +1, +1, 0, \quad -1, -1, -1, 0,$$

where the signs "+" and "−" indicate the relative sense of current flow and "0" indicates a coil omitted from circuit.

Figure 7A:
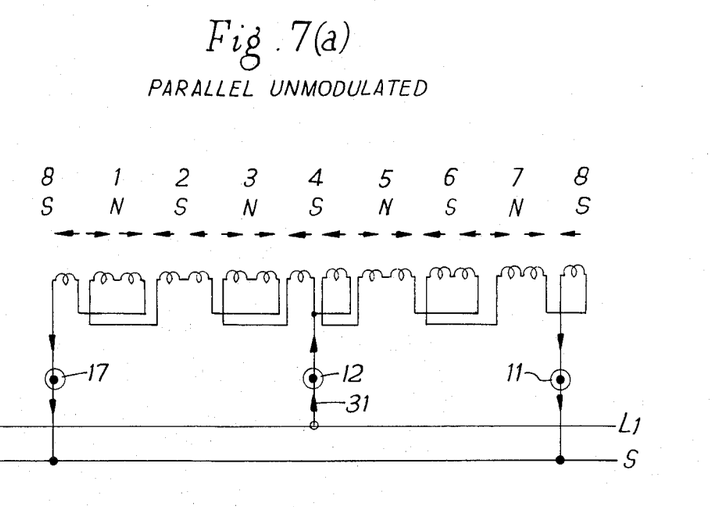
Figure 7B:
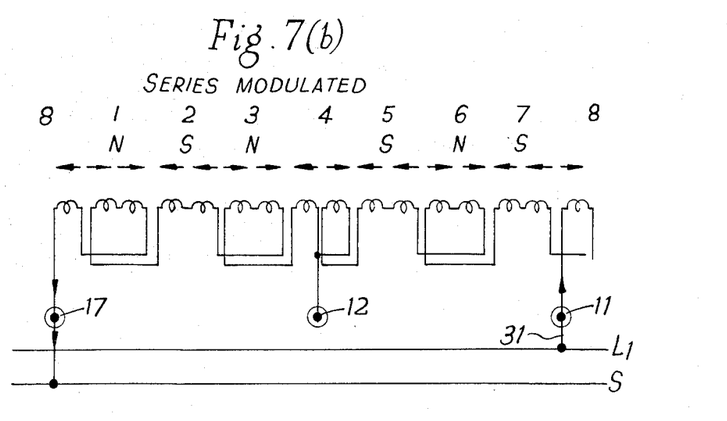

For phase-windings having an even number of slots per pole per phase-winding, a modified arrangement as shown in FIGS. 7(a) and 7(b) provides a satisfactory alternative and avoids the need to omit coils from circuit in the modulated connection.

FIGS. 7(a) and 7(b) show a phase-winding having 8-poles and 2-slots per pole. All the coils are serially connected between terminals 17 and 11. The second coil of pole 8, both coils of poles 1, 2 and 3 and the first coil of pole 4 are connected between terminals 17 and 12. The second coil of pole 4, both coils of poles 5, 6 and 7 and the first coil of pole 8 are connected between terminals 12 and 11.

In FIG. 7(a), terminal 12 is supplied from phase-line $L_1$ through connection 31. Both terminals 11 and 17 are connected to line S or star centre point. This connection provides current flow through the phase winding in the directions of the arrows. The resulting M.M.F. waveform is as shown in FIG. 1(a).

In FIG. 7(b), terminal 17 remains connected to star centre point S, terminal 11 is now supplied by connection 31 from line $L_1$ and terminal 12 is isolated. Current flow in all that part of the winding between terminals 12 and 11 is now reversed. In particular, the direction of current flow in one coil of each of poles 4 and 8 is now opposite to that in the other coil thereof. The magnetic effect of the one coil cancels the other and poles 4 and 8 are neutralised. The M.M.F. waveform of FIG. 1(c) is again provided, but now by coil-opposition instead of coil omission.

In the notation previously used, the phase-winding of FIGS. 7(a) and 7(b) is represented, in the unmodulated connection, thus:

$$+2, +2, +2, +2, \quad +2, +2, +2, +2,$$

and in the modulated connection, thus:

$$+2, +2, +2, +1, -1, \quad -2, -2, -2, -1, +1,$$

Figure 12A:
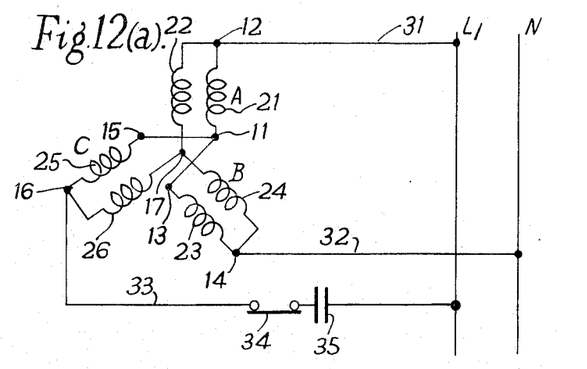
FIGS. 12(a) and 12(b) are a corresponding pair of circuit diagrams showing alternative connections to a single-phase supply of an alternating-current winding having three phase-windings to provide the unmodulated and modulated pole-numbers.
Figure 12B:
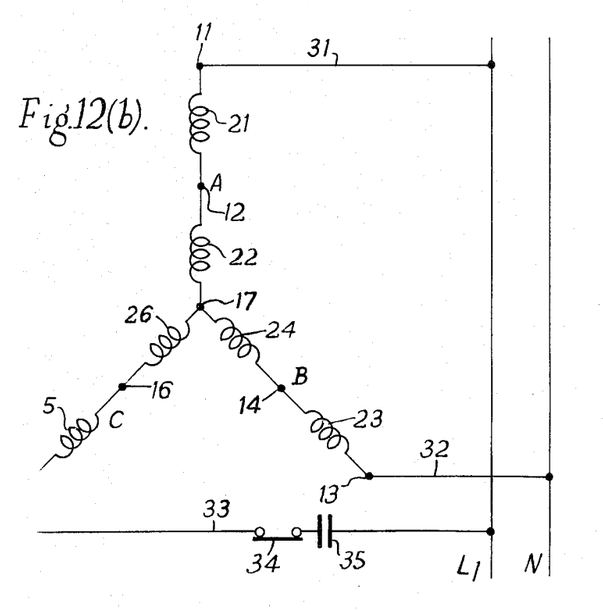

FIGS. 12(a) and 12(b) show respectively parallel star unmodulated connections and series star modulated connections of a plurality of three phase-windings all of the form shown in FIGS. 7(a) and 7(b). The phase-winding of FIGS. 7(a) and 7(b) is shown as phase-winding A and has the terminal connections correspondingly numbered. The phase-winding part between terminals 11 and 12 is shown at 21 and the part between terminals 12 and 17 is shown at 22.

Phase-winding B comprises identical parts 23, 24 connected between terminals 13, 14 and 14, 17. Phase-winding C comprises identical parts 25, 26 connected between terminals 15, 16 and 16, 17.

In the parallel star connection of FIG. 12(a), terminals 11, 13 and 15 are connected together and terminals 12 and 14 are supplied by conductors 31 and 32 respectively from a single phase supply on lines $L_1$ and N. Terminal 16 is supplied by way of conductor 33, a starting switch 34 and a capacitor 35 from line $L_1$.

In the series star connection of FIG. 12(b), terminals 11 and 13 are supplied by the conductors 31 and 32 respectively from the single phase supply on lines $L_1$ and N and terminal 15 is supplied by way of conductor 33, starting switch 34 and capacitor 35 from line $L_1$. Terminals 12, 14 and 16 are isolated.

All coils of all phase-windings are connected in circuit when starting a motor using this winding, for both the unmodulated and the modulated connections. When the machine has attained the corresponding full running speed, connection of phase-winding C is no longer required.

In the coil group circuits of FIGS. 7(a) and 7(b) and in the other coil group circuits described herein which require no omission of coils from circuit in the modulated connection, it will be immediately evident to those skilled in the art that the polarity of the poles provided by the phase-winding part 21 between terminals 11 and 12, which becomes reversed in circuit, is arbitrarily dependent upon the original phasing of the coils concerned. Thus, the unmodulated connection giving the waveform of FIG. 1(a) can equally well be provided by serial connection of the coils and the modulated connection, giving the waveform of FIG. 1(c), by the parallel connection of the coils.

Figure 8A:
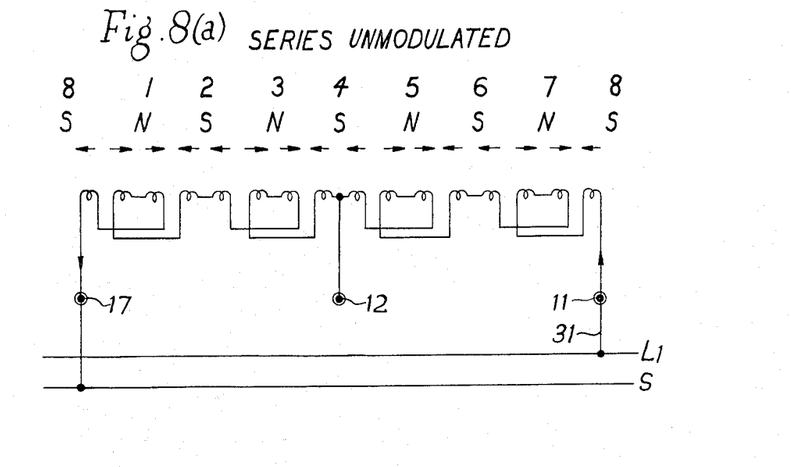
Figure 8B:
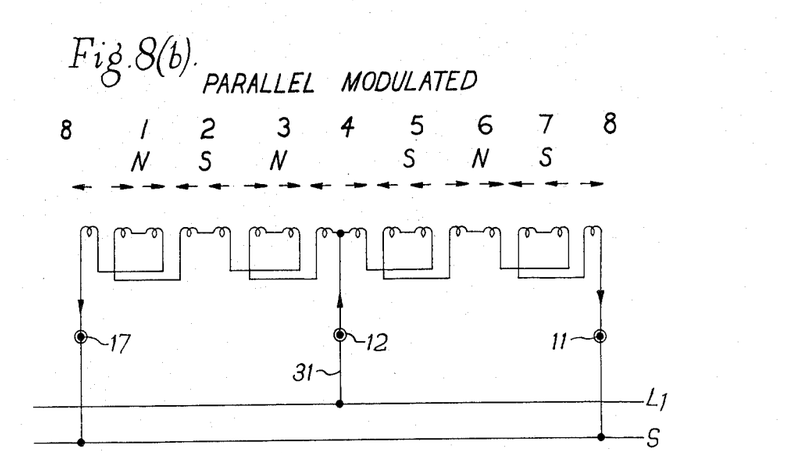

FIGS. 8(a) and 8(b) show the modified connections involved, compared respectively with the circuits of FIGS. 7(a) and 8(b).

For the three modified phase-windings, the connections of FIG. 8(a) may be provided by the series star connection of FIG. 12(b) and the connections of FIG. 8(b) by the parallel star connections of FIG. 12(a).

It will further be evident that instead of the alternative parallel star and series star connections of FIGS. 12(a) and 12(b), the unmodulated and modulated conditions may instead be provided by parallel star and series delta alternative connections. Such 3-phase circuit star/delta transformation are conventional and the changed permanent connection between the phase-winding ends and the changed switching connections need not be described herein.

The two phase-winding arrangements described so far provide the M.M.F. waveform of FIG. 1(c) in the modulated connection. However, it is more satisfactory in practice to provide a modulated waveform which varies in amplitude throughout the modulation cycle in a manner which is as nearly sinusoidal as possible. A nearer approach to sinusoidal pole amplitude variations is provided by the phase-winding M.M.F. waveforms represented in FIGS. 2(c), 3(c) and 4(c).

Figure 2:
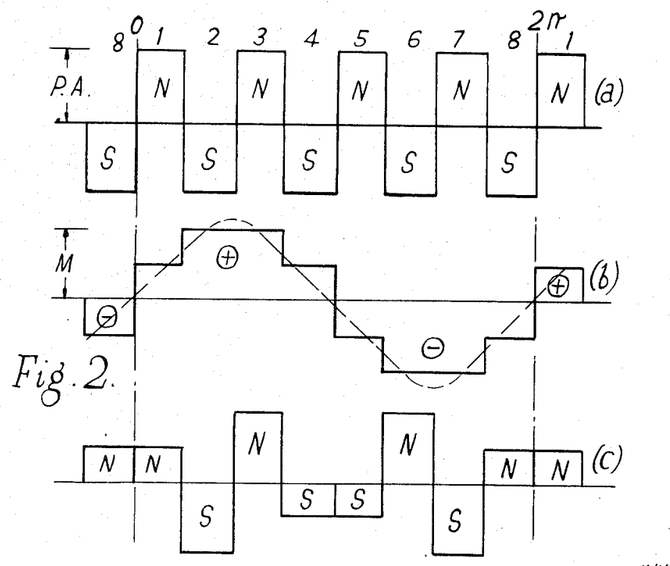
Figure 3:
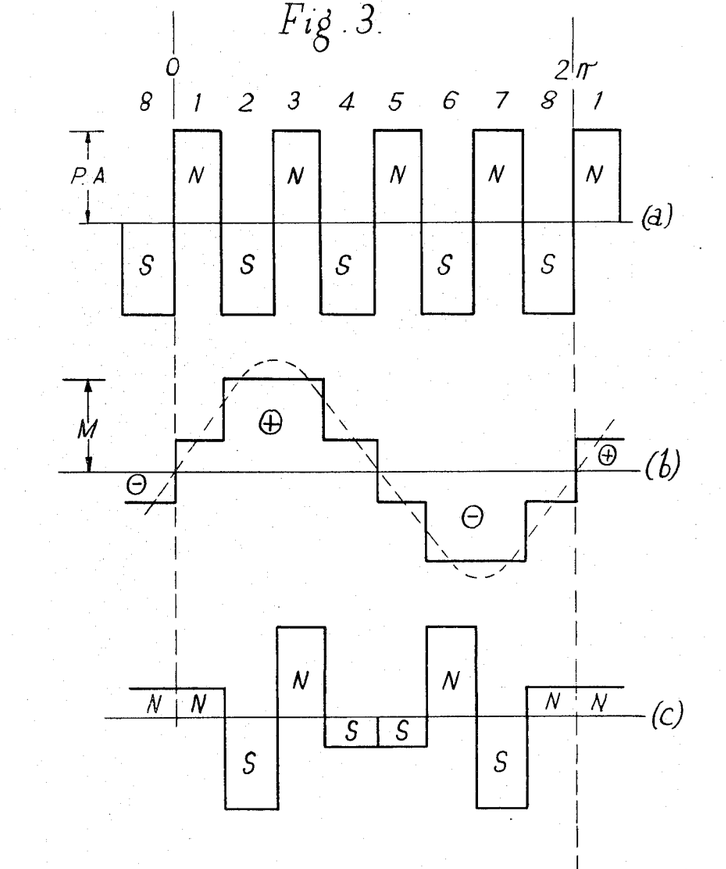
Figure 4:
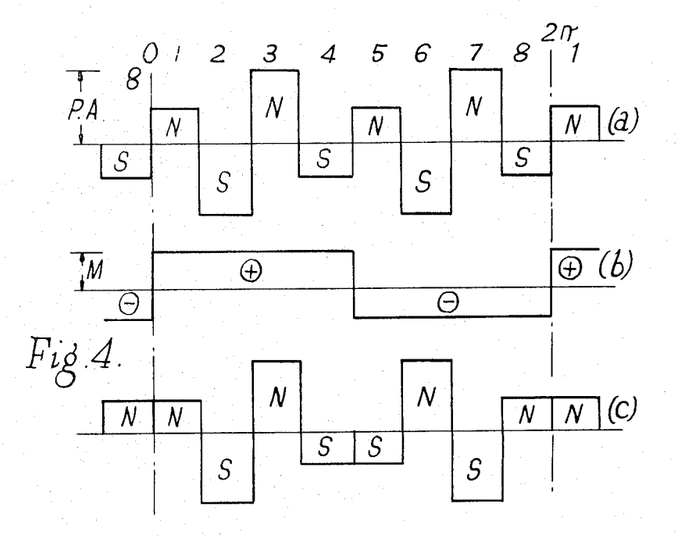

In the cases of FIGS. 2(c) and 3(c), the modulated waveform is derived from integral slot per pole per phase windings using the more nearly sinusoidal shape of the modulation waves of FIGS. 2(b) and 3(b) respectively. In the case of FIG. 4(c), the modulated waveform is obtained by a fractional slot per pole per phase winding giving a cyclically varying amplitude distribution of the original unmodulated waveform.

FIG. 2(a) shows eight poles of one integral slot phase-winding, of alternating polarity and equal amplitude "PA," in the full circumference of the phase-winding.

FIG. 2(b) shows a modulation wave of cyclic form throughout a single cycle having a positive value of unity, represented by the arrow "M," extending over poles 2 and 3, a positive value of half amplitude for poles 1 and 4, a negative value of unity extending over poles 6 and 7 and a negative value of half amplitude for poles 5 and 8. It will be seen that this corresponds more nearly to a sinusoidal variation, as represented by the broken line superimposed on the figure, than does the modulation wave of FIG. 1(b).

The resultant modulated waveform is shown in FIG. 2(c). The reversal of polarity of poles 5 to 8 is obtained by reversal of the sense of current flow in the corresponding coil groups of the phase-winding. Reduction of amplitude of poles 1, 4, 5 and 8 is obtained by omitting from circuit one coil of each of the corresponding coil groups.

Figure 9A:
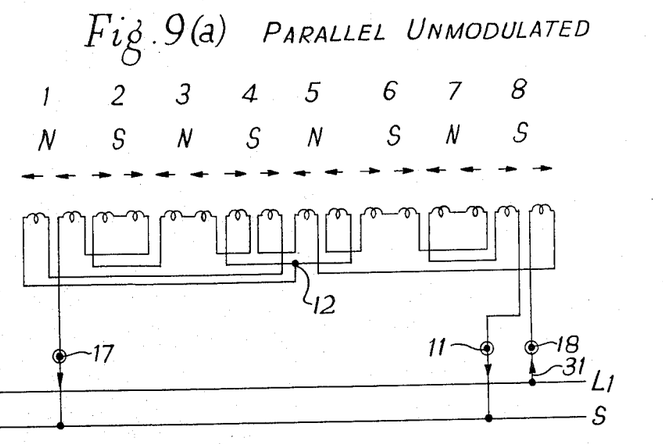
Figure 9B:
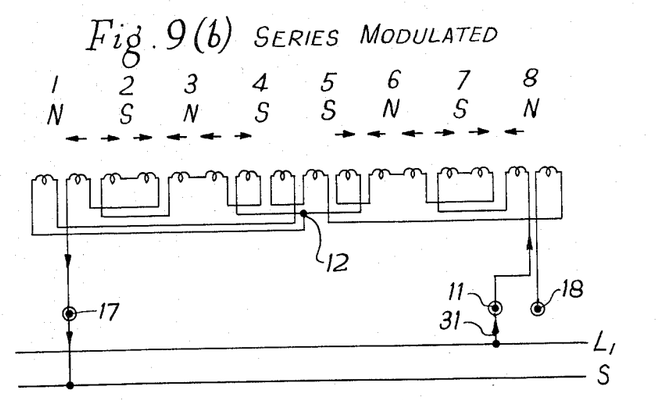

Suitable coil connections for one phase-winding are shown in FIGS. 9(a) and 9(b).

In the arrangements of FIGS. 9(a) and 9(b), which represent a single phase-winding of 8-poles with 2 slots per poles per phase-winding, the second coil of pole 1, both coils of poles 2 and 3 and the first coil of pole 4 are serially connected between terminals 17 and 12. The second coil of pole 5, both coils of poles 6 and 7 and the first coil of pole 8 are serially connected between terminals 12 and 11. The remaining coils of poles 1, 4, 5 and 8 are serially connected in a separate branch between terminals 12 and 18.

In FIG. 9(a) all coils are energized, terminal 18 being supplied by connection 31 from phase line $L_1$ and both terminals 11 and 17 being connected to star centre point S. The resultant M.M.F. waveform is as shown in FIG. 2(a).

In FIG. 9(b), terminal 11 is supplied by connection 31 from phase line $L_1$ and terminal 17 remains connected to star centre point S. Terminal 12 is isolated. Thus one coil of each of poles 1, 4, 5 and 8 is omitted from circuit, so that all these poles are reduced to half amplitude in this modulated connection. Moreover, the phase-winding part between terminals 12 and 11 is reversed in circuit, so that all of poles 5 to 8 are reversed in polarity. The resultant M.M.F. waveform is that shown in FIG. 2(c), that is to say, the modulation wave of FIG. 1(b) has been applied to the unmodulated 8-pole, M.M.F. waveform of the connection of FIG. 9(a).

Again, the M.M.F. waveform of FIG. 2(c) represents a 6-pole waveform and a 10-pole waveform combined. The relative amplitudes of the 6-pole and 10-pole components are different from the relative amplitudes in the M.M.F. waveform of FIG. 1(c).

The phase-winding of FIG. 9(a) is represented, in unmodulated connection thus:

+2, +2, +2, +2,    +2, +2, +2, +2, and in the modulated connection of FIG. 9(b) thus:

0.+1, +2, +2, +1.0,    0.−1, −2, +2, −1.0,

As in the arrangement of FIG. 6(b), selected coils are omitted from circuit in the modulated connection. The 2-slot per pole per phase winding described does not lend itself readily to amplitude reduction of the end coils 1, 4 and 5, 8 of the two modulation half-cycles by coil opposition instead of coil omission. However, coil omission can be avoided with integral slot phase-windings having an odd number of slots per pole per phase.

An example is shown in FIGS. 3(a), 3(b) and 3(c). FIG. 3(a) represents the M.M.F. waveform of a phase-winding for 8-poles, having 3 slots per pole. FIG. 3(b) shows a modulation waveform providing reversal of polarity of poles 5 to 8 and reduction of amplitude to one-third the former amplitude of poles 1, 4, 5 and 8.

The circuit arrangement of the coils of the phase-winding is a simple variant of that shown in FIGS. 7(a) and 7(b) and it is not considered necessary to provide a circuit diagram of the coil groups of this phase-winding.

Instead of the 2 coils per pole of FIGS. 7(a) and 7(b), 3 coils per pole are serially connected. In the modulated connection, two of the three coils of poles 1, 4, 5 and 8 are phased to be in aiding relationship and one coil is phased in opposition thereto, to provide a resultant M.M.F. of one-third amplitude.

In the unmodulated connection the phase-winding is represented by the notation:

+3, +3, +3, +3,    +3, +3, +3, +3, and in the modulated connection thus:

−1, +2, +3, +3, +2, −1,    +1, −2, −3, −3, −2, +1,

From this notation it will be clear that the third coil of pole 8, the second and third coils of pole 1, all three coils of poles 2 and 3, the first and second coils of pole 4 and the first coil of pole 5 are serially connected between terminals 17 and 12. The third coil of pole 4, the second and third coils of pole 5, all three coils of poles 6 and 7, the first and second coils of pole 8 and the first coil of pole 1 are serially connected between terminals 12 and 11.

The M.M.F. waveform of FIG. 3(a) is provided in a plurality of three phase-windings by the parallel star connection of FIG. 12(a). The modulated M.M.F. waveform of FIG. 3(c) is provided by the series star connection of FIG. 12(b). (Instead, the equivalent parallel star and series delta connections may be used.)

Again, the M.M.F. waveform of FIG. 3(c) represents 6-pole and 10-pole component waveforms combined.

The required sinusoidal amplitude distribution of the modulated M.M.F. waveform may be obtained by suitable fractional slot phase windings. One example is shown in the diagrams of FIGS. 4(a), 4(b) and 4(c) and the circuit diagrams of FIGS. 10(a) and 10(b).

Figure 10A:
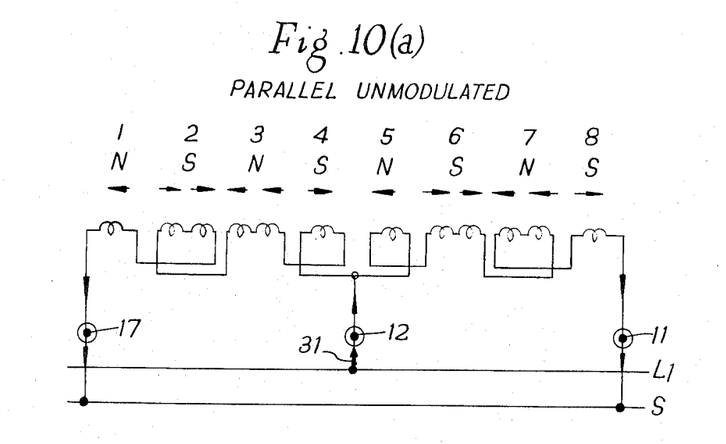
Figure 10B:
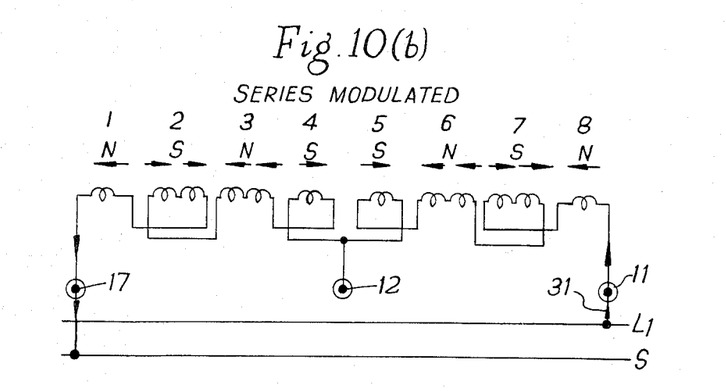

FIGS. 10(a) and 10(b) show a phase-winding for 8 poles in which poles 1, 4, 5 and 8 are provided each by one coil and poles 2, 3, 6 and 7 are provided each by a coil group of two coils. In the unmodulated connection of FIG. 10(a), the cyclically varying M.M.F. waveform of FIG. 4(a) results. Poles 2, 3, 6 and 7 are of equal pole-amplitude of value "PA." Poles 1, 4, 5 and 8 are each of half the pole-amplitude "PA."

In the modulated connection of FIG. 10(b), solely the coils of poles 5 to 8, connected between terminals 11 and 12, are reversed in circuit relatively to the coils of poles 1 to 4, connected between terminals 12 and 17. From this connection, the M.M.F. waveform of FIG. 4(c) results. This will be recognised as an identical waveform to that of FIG. 2(c) which was derived from an integral slot winding. In the case of the present fractional slot winding, the modulation wave is simply the positive and negative step function wave of FIG. 4(b) effected by current flow reversal in the phase-winding part to which the negative portion of the modulation wave is applied.

FIG. 4(c) represents exactly the same combination of 6-pole and 10-pole components M.M.F. waveforms as does FIG. 2(c).

For a plurality of three phase-windings of the form of FIG. 10(a), the unmodulated condition may be provided by the parallel star connection of FIG. 12(a). The modulated condition of FIG. 10(b) is then provided by the series star connection of FIG. 12(b).

Again, alternative parallel-star and series delta connections may be used instead.

Again, series unmodulated and parallel modulated connections may be used by phase reversal of the coils between terminals 11 and 12, corresponding to the modification shown in FIGS. 8(a) and 8(b).

Attention may with advantage be directed to a number of facts regarding the pole-amplitude modulation arrangements of FIGS. 1 to 4.

The poles are numbered from an arbitary origin. Terminal 17 is the origin chosen throughout for consistency.

If the poles are reversed in polarity throughout the phase-winding, "N" for "S" and "S" for "N," the waveforms in every case remain effectively unchanged.

The modulation wave is applied positive half-cycle first. This is immaterial, so long as it is applied similarly to all of the plurality of phase-windings but, for consistent definition herein, the modulation wave is always defined as having its origin immediately preceding the positive-going half-cycle.

The modulation wave origin coincides with the phase-winding origin at terminal 17 and pole 1. It is immaterial in any one phase-winding where the modulation wave begins. However, it is the relative spacing of the plurality of modulation waves applied to the plurality of phase-windings which determines whether the higher or the lower of the two modulated pole-numbers is eliminated in the resultant field.

Where mention is made herein of relative spacing of a plurality of phase-windings, for eliminating the unwanted modulated pole-number, it must be understood that if the modulation wave origins do not coincide with the phase-winding origins, the required relative spacing must then be defined in terms of the three modulation waves, not the phase-windings.

In the examples chosen, the unmodulated pole-number is always 8-poles. The modulation wave is always one complete cycle and the two modulated pole-numbers are 6-poles and 10-poles.

Certain generalisations can be made. A modulation wave of one complete cycle always produces two modulated pole-numbers differing from the original, unmodulated, pole-number by one pole-pair, two complete cycles by two pole-pairs and so on.

For example, if the waveform of FIG. 1(a) were produced in a half-revolution of the phase-winding and repeated in the second half-revolution, the unmodulated pole number would be 16-poles. If the modulation wave of FIG. 1(b) remained unchanged at one complete cycle, the two modulated pole-numbers would be 14-poles and 18-poles.

If the waveform of FIG. 1(a) and the modulation wave of FIG. 1(b) were both repeated, the unmodulated pole-number would be 16-poles and the two modulated pole-numbers 12-poles and 20-poles.

If the modulation waveform of FIG. 1(b) were repeated for two complete cycles but not the waveform of FIG. 1(a), the unmodulated pole-number would remain 8-poles but the two modulated pole-numbers would be 4-poles and 12-poles.

If a modulation wave of more than one complete cycle is applied to each of a plurality of phase-windings, the first cycle thereof is not distinguishable in any physical way from the subsequent cycles, except in its relation to the phase-winding origin. Since this relationship is arbitrary, as has been explained, in cases of multiple-cycle modulation waves, the required relative spacing for unwanted pole-number elimination may be considered from the origin of any one of the modulation cycles.

In summary, therefore, the first step of the pole-changing method of this invention may be defined by the following rule:

Take a known phase-winding providing P pole-pairs. If a pole-amplitude modulation wave is applied to that phase-winding, two new pole-numbers are created in the resultant M.M.F. waveform. One new pole-number is $(P-M)$ pole-pairs and the other is $(P+M)$ pole-pairs, where M is the number of complete cycles of the modulation wave.

*Elimination of the unwanted modulated pole-number*

It has now been explained how second and third new pole-numbers initially wound for a first pole-number, may be created in a phase-winding, by applying any one of a number of different modulation waves.

A single-phase winding according to the present invention has the two windings which are energised from the single-phase supply physically disposed for elimination of the unwanted, third, pole-number.

Early in this specification it was stated that either new pole-number could be eliminated in the resultant field developed by a plurality of phase-windings together, by providing certain relative spacing between the phase-windings. Later, after the nature of the modulation waves had been explained, it was added that the required relative phase-winding spacing more generally defined in relation to the plurality of modulation waves applied to the plurality of phase-windings. The required relative spacing will now be explained more fully in relation to an A.C. winding comprising three phase-windings, since this winding can be readily understood from a conventional 3-phase winding.

The function of a 3-phase winding is to provide a rotating 3-phase magnetic field when energised from a 3-phase supply. This requires that the phase-windings are relatively spaced by 120° electrically. The phase-sequence is taken as A, B, C. Since there are two senses of rotation around the axis of a winding, phase-sequence must be defined in relation to one sense of rotation, say clockwise. In this reference sense of rotation, the phase-sequence A, B, C corresponds to the phase-band sequence +A, −C, +B, −A, +C, −B; this notation can be applied to every 3-phase rotary machine and as such is well-known theory.

A single-phase winding according to the present invention has the phase-windings, three in this example, spaced electrically in accordance with the above-mentioned facts. The spacing required for elimination of the unwanted pole-number is mechanical spacing around the winding axis.

It is a requirement of a single-phase winding, wherein elimination of the third pole-number is by spacing, that the three modulation waves applied to the three phase-windings are relatively spaced by 120° mechanical around the winding axis.

The relative spacing can be measured from corresponding points on all three modulation waves but it is most clearly measured from the three origins, which are defined as preceding the positive-going half-cycle of the relevant wave.

Since 120° mechanical is one-third of a revolution around the winding axis, it will be evident that this spacing requirement can be satisfied with either the sequence A, B, C considered in the reference sense of rotation, or with the sequence A, C, B.

It is the choice between these two modulating sequences which determines whether the higher or the lower modulated pole-number is eliminated in the resultant field of the three phase-windings.

This complete spacing requirement of a single-phase winding, comprising three phase-windings, is defined by the following rule:

If one arbitrary sense of rotation be taken for reference, say clockwise, if the electrical phase-sequence in this sense is A, B, C, corresponding to the phase-band sequence +A, −C, +B, −A, +C, −B, and if the three modulating waves are applied to the three phase-windings all in this reference sense, with the positive half-cycle first, then in order to eliminate either modulated pole-number from the resultant field, corresponding points of the modulation waves of the three phase-windings, say their origins, must be relatively spaced 120° mechanical around the winding axis.

This requirement satisfied, then the lower pole-number is eliminated to leave the higher pole-number if the modulation waves at the said 120° spaced points relate to the phases A, B, C in sequence, in the reference sense of rotation. The higher pole-number is eliminated to leave the lower pole-number if the modulation waves at the 120° spaced points relate to the phases A, C, B in sequence, in the reference sense of rotation.

Figure 11A:
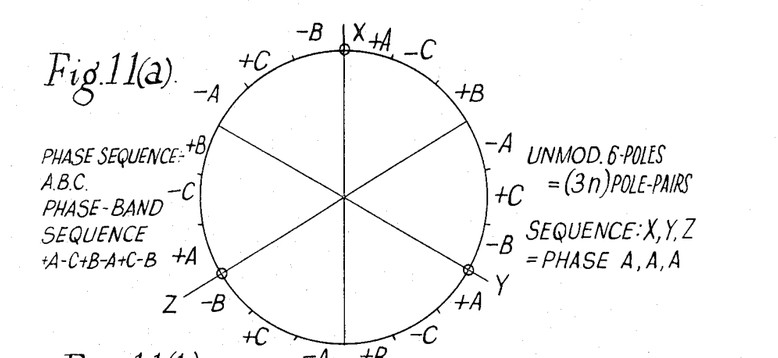
FIGS. 11(a) to 11(c) are diagrams showing the elimination of the unwanted modulated pole-number in an alternating current winding having three phase-windings.
Figure 11B:
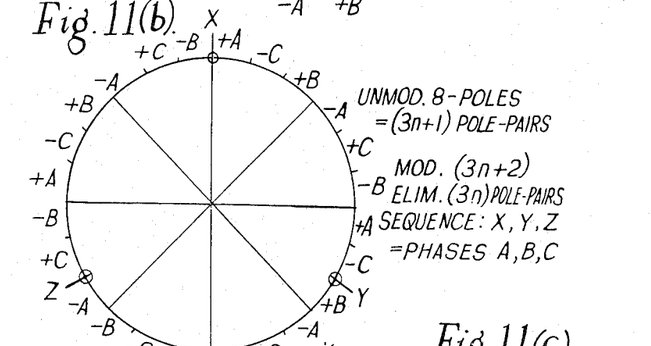
Figure 11C:
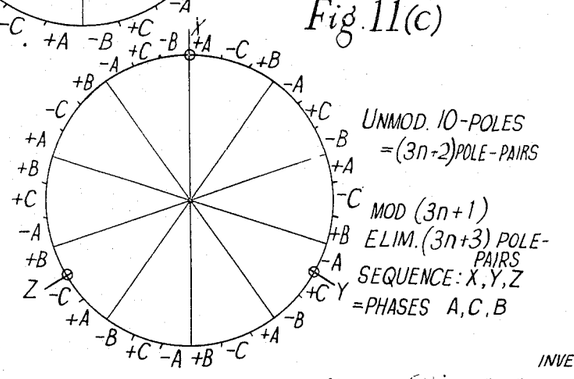

This can be seen pictorially from the clock diagrams of FIGS. 11(a), 11(b) and 11(c). These diagrams may be regarded each as a section through a 3-phase winding in a plane perpendicular to the axis. The circumference of the circle of each diagram represents the circumference of the 3-phase winding. The phase-bands, comprising conductors extending through the plane of the diagrams, are marked in each case. For all the diagrams, the electrical phase-sequence is A, B, C. Hence, as shown the phase-band sequence is +A, −C, +B, −A, +C, −B.

Three chosen points, relatively spaced at 120° around the winding axis, are shown X, Y and Z in each diagram.

FIG. 11(a) shows a 3-phase winding providing 6-poles unmodulated and is typical of windings for unmodulated pole-numbers of the form $(3n)$ pole-pairs. The two modulated pole-numbers created are $(3n-1)$ pole-pairs and $(3n+1)$ pole-pairs. In this case, either modulated pole-number can be eliminated, but only by an expedient which displaces the modulating waves around the winding axis relatively to the physical position of the phase-windings B and C.

FIG. 11(b) shows a 3-phase winding for 8-poles unmodulated and is typical of the form $(3n+1)$ pole-pairs. The two modulated pole-numbers created are $(3n)$ and $(3n+2)$ pole pairs. The phase-sequence at points X, Y and Z is A, B, C. Hence the pole-number $(3n)$ is eliminated and the pole-number $(3n+2)$ remains.

FIG. 11(c) shows a 3-phase winding for 10-poles unmodulated and is typical of the form $(3n+2)$ pole-pairs. The two modulated pole-numbers created are $(3n+1)$ and $(3n+3)$ pole-pairs. The phase-sequence at points X, Y and Z is A, C, B. Hence the pole-number $(3n+1)$ remains and the pole-number $(3n+3)$ is eliminated.

It is preferred, for simplicity of construction of the winding, to choose alternative pole-numbers which are obtainable by a winding of the form of FIG. 11(b) or the form of FIG. 11(c). In such cases, for, respectively, the increase and decrease of pole-number in the modulated connection, all three phase-windings may be made and switched identically.

That is to say, if coil arrangement and alternative connections of FIGS. 7(a) and 7(b) are chosen for phase-winding A, exactly the same coil arrangement and connections are used for phase-windings B and C. Similarly, any other of the many means of modulation used for phase-winding A is used identically for phase-windings B and C.

As an alternative to elimination of the unwanted, third, pole-number by spacing as explained above, the unwanted pole-number may be eliminated by the chording chosen for the windings. The technique of elimination of a particular pole-number component from the magnetomotive force waveform of a winding is well-known and need not be described herein.

Generally, elimination by spacing is preferred when the first and second pole-numbers are in close-ratio, below 2:1, and chording is preferred when the pole-numbers are in wide-ratio, above 2:1.

Considering now the condition when phase-windings A and B of a 3-phase star-connected winding A, B, C, are serially connected across a single phase supply and phase-winding C is disconnected from circuit.

As is well-known, a machine with such a 3-phase winding operates satisfactorily as a single-phase machine, provided that it is first run up to speed. The inherent starting torque with a single phase energized 3-phase winding is zero.

By the theory of symmetrical components, it can be shown that a single phase supply current flowing between two terminals of a star-connected 3-phase winding, for example between terminals 12 and 14 of FIG. 12(a) or terminals 11 and 13 of FIG. 12(b), terminals 15 and 16 being disconnected from circuit, can be resolved into two equal and balanced 3-phase current systems of opposite sequence, that is, two 3-phase current systems rotating in the same sense, the vectors of the first system being in the sequence A, B, C and those of the second system being in the sequence A, C, B.

Figure 13:
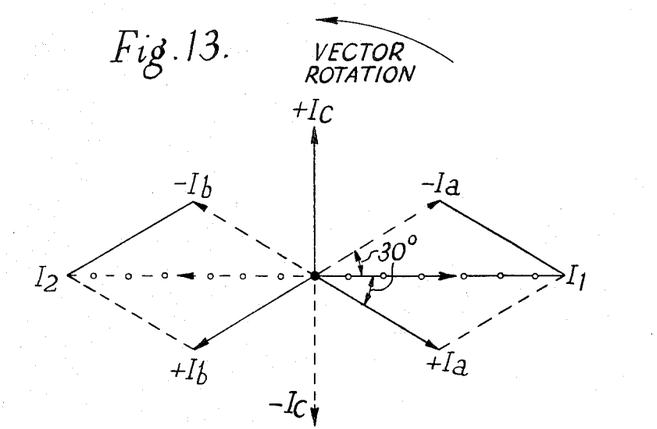
FIG. 13 is a vector diagram relating to the supply from a single phase supply of a motor winding comprising three phase-windings.

The condition is shown by the vector diagram of FIG. 13. In FIG. 13, the single phase current is shown by the two equal and opposite vectors $I_1$ and $I_2$, representing the same current flowing through both the windings A and B, in one winding towards the star centre and in the other winding away from it. The corresponding resolved 3-phase currents are shown at $+I_a$, $+I_b$ and $+I_c$. The negative sequence currents are shown at $-I_a$, $-I_b$ and $-I_c$. The phase angle between the single phase current $I_1$ and each of the 3-phase currents $+I_a$ and $-I_a$ is 30°. Similarly for the current $I_2$ and each of the 3-phase currents $+I_b$ and $-I_b$.

Provided that suitable starting arrangements are provided, the forwardly rotating field (positive current vectors) gradually increases in magnitude and the reversely rotating field (negative current vectors) gradually diminishes in magnitude as the machine runs up to speed.

It is preferred to use the star-connection of the three phase-windings and to employ phase-winding C as a starting winding, as shown in FIGS. 12(a) and 12(b). To this end, the phase-winding C is supplied with current at terminal 16 or terminal 15 respectively in the connections of FIG. 12(a) and FIG. 12(b), by way of a suitable capacitor 35, to provide a correctly phase-displaced starting current through the phase-winding C from the single phase supply between the lines $L_1$ and N. When the machine has run up to speed, the phase-winding C may be disconnected from its supply circuit by opening the switch 34.

Figure 14:
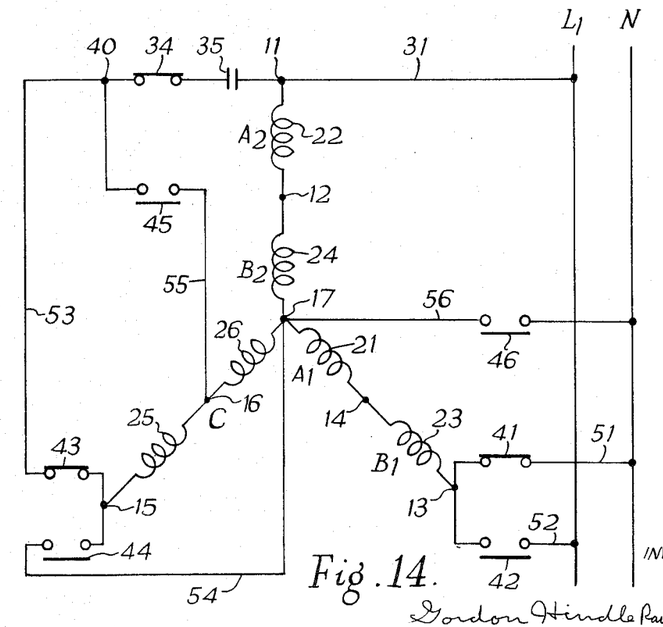
FIG. 14 is a circuit diagram showing the switching connections for supplying from a single phase supply a motor winding comprising three phase-windings, one being used as a starting winding, to provide either of two pole-numbers.

A preferred manner of connecting the three phase-windings is shown in FIG. 14. In FIG. 14, the windings and terminals corresponding to FIGS. 12(a) and 12(b) are indicated by the same reference numerals.

It will be noted that the arrangement of the windings in serial connection between terminals 11 and 13 is different from the arrangement of FIGS. 12(a) and 12(b).

In FIG. 14, part 22 of phase-winding A, part 24 of phase-winding B, part 21 of phase-winding A and part 23 of phase-winding B are serially connected, in the stated sequence, between terminals 11, 12, 17, 14 and 13. Parts 25 and 26 of phase-winding C are serially connected between terminals 15, 16 and 17.

Terminal 11 is permanently connected by conductor 31 to line $L_1$. Terminal 13 is connected by way of switch 41 and conductor 51 to line N, and by way of switch 42 and conductor 52 to line $L_1$.

The starting switch 34 and starting capacitor 35 are connected as a branch between terminal 11 and a terminal 40. Terminal 15 is connected by way of switch 43 and conductor 54 to terminal 17. Terminal 40 is connected by way to switch 45 and conductor 55 to terminal 16. Terminal 17 is connected by way of switch 46 and conductor 56 to line N.

In the series connection of the phase-winding halves 22, 24, 21, 13 and 25, 26, as shown in FIG. 14, switches 41 and 43 are closed and switches 42, 44, 45 and 46 are open. Phase-windings A and B are thus serially connected between lines $L_1$ and N, with the sequence of winding parts shown. Phase-winding C is connected from the centre of this series combination, at terminal 17, to the starting capacitor 35 by way of the starting switch 34. When the machine has run up to speed, the switch 34 will be opened.

In the parallel connection of the phase-winding halves, switches 42, 44, 45 and 46 are closed and switches 41 and 43 are open. Phase-windings A and B are thus connected in parallel with winding parts 22 and 24 in parallel with winding parts 23 and 21, terminals 11 and 13 being supplied from line $L_1$ and terminal 17 being connected to line N. Phase-winding C has its parts 25, 26 connected in parallel with terminal 16 supplied from the starting capacitor 35 by way of the starting switch 34.

When the machine has run up to the speed corresponding to the parallel connection of the phase-winding halves, the switch 34 will be opened.

The connections of FIG. 14 require six leads brought out from the winding to six terminals and six switches excluding the starting switch but including the starting branch circuit to terminal 40. A permanent lead out from terminal 11 is also required.

Figure 15:
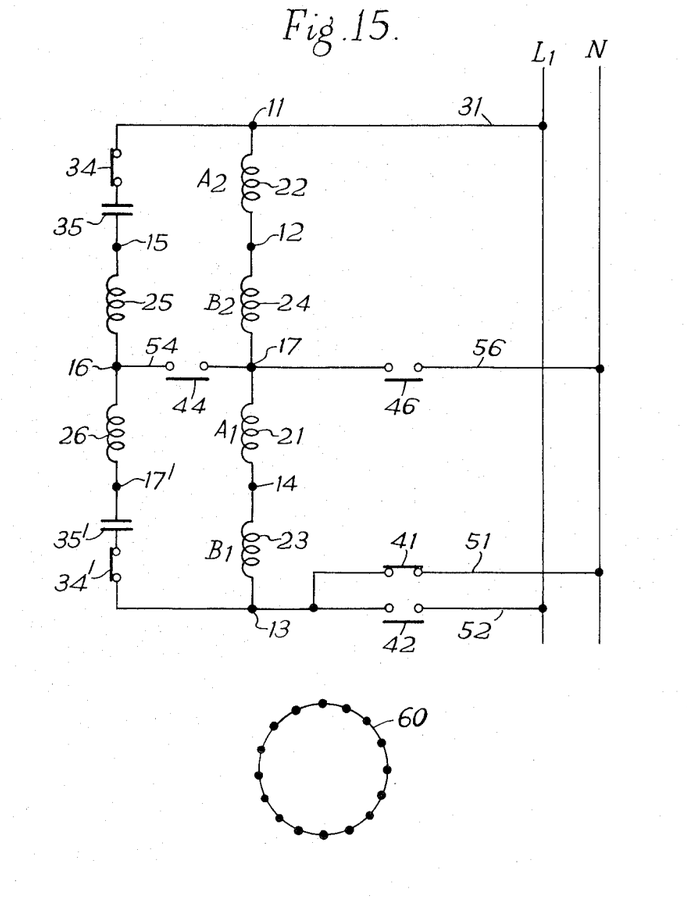
FIG. 15 is a circuit diagram, alternative to FIG. 14, showing a different arrangement of the motor windings.

FIG. 15 shows an alternative mode of connecting the three phase-windings. The arrangement of the parts 22, 24; 21, 23 of phase-windings A and B between terminals 11, 12, 17, 14 and 13 is the same as in FIG. 14. However, phase-winding C is not permanently connected to the star-centre 17, at one end. In FIG. 15, the two halves 25, 26, of phase-winding C are serially connected between terminals 15, 16 and 17'.

As in the arrangement of FIG. 14, terminal 11 is permanently connected by conductor 31 to line $L_1$. Terminal 13 is connected by way of switch 41 and conductor 51 to line N and by way of switch 42 and conductor 52 to line $L_1$. Terminal 17 is connected by way of switch 46 and conductor 56 to line N.

In contrast to the connections of phase-winding C of FIG. 14, terminal 15 of FIG. 15 is connected by way of a starting switch 34 and starting capacitor 35 to terminal 11. Terminal 17' is similarly connected by way of a starting switch 34', ganged with switch 34, and a starting capacitor 35' to terminal 13. Terminal 16 is connected by way of switch 44 and conductor 54 to terminal 17.

In the series connection of the phase-winding parts, switch 41 is closed and switches 42, 44 and 46 are open, as shown in FIG. 15, so that the phase-windings A and B are serially connected, with the sequence of winding parts shown, between lines $L_1$ and N. With switches 34, 34' closed, phase-winding parts 25, 26 are serially connected with the capacitors 35, 35' between lines $L_1$ and N.

In the parallel connection of the phase-winding parts switches 42, 44 and 46 are closed and switch 41 is open. The phase-windings A and B are then connected in parallel across lines $L_1$ and N, with winding parts 22 and 24 in parallel with winding parts 21 and 23. Terminal 16 is connected to terminal 17 and the phase-winding parts 25, 26 of phase-winding C are connected in parallel with each other between terminal 17 and the common terminals 11 and 13.

In either the series or parallel connection the starting switches 34, 34' will be opened when the machine has run up to the corresponding running speed.

The connections of FIG. 15 require four leads brought out from the winding to four terminals and four switches excluding the two starting switches. A permanent lead out from terminal 11 is also required in this connection.

FIG. 15 further shows a pole-changing single-phase induction motor wherein the three phase-windings A, B and C are wound on the machine stator. The rotor, in this instance, is a squirrel-cage rotor 60.

In one form of the invention, phase-winding C is different from phase-windings A and B. To avoid coil-switching of phase-winding C for use as a starting winding at the two speeds corresponding to the unmodulated and modulated pole-numbers, a single winding is used for starting at both speeds.

What I claim is:

1. In a single-phase, pole-changing motor, providing first and second pole-numbers in ratio other than 2:1, the combination of a primary winding having two winding parts, herein designated windings A and B, said windings A and B both being divided into first and second halves, a starting winding, herein designated winding C, said three windings A, B and C being arranged around said primary winding circumference with phase-bands thereof located in the sequence A, C, B, repeated for each pole of said first pole-number, means for supplying single-phase alternating current to said windings A and B, means for supplying phase-displaced single-phase alternating current to winding C during motor starting and means for reversing in current-carrying sense either one of said first and second halves of said windings A and B during running at said second pole-number.

2. In a single-phase, pole-changing motor, the combination according to claim 1, wherein said first and second pole-numbers differ from each other by one pole-pair and wherein said first and second half of each winding A and B comprises respectively, the first half of all the consecutive phase bands of the winding and the second half of all the consecutive phase bands thereof.

3. In a single-phase, pole-changing motor, the combination according to claim 1, wherein said windings A and B are identical with each other.

4. In a single-phase, pole-changing motor, the combination according to claim 3, wherein corresponding parts of windings A and B are spaced apart by 120° mechanical around the primary winding circumference.

5. In a single-phase, pole-changing motor, the combination according to claim 1, wherein winding C is divided into first and second halves, including means for reversing in current-carrying sense either one of said first and second halves during motor starting.

6. In a single-phase, pole-changing motor, the combination according to claim 4, wherein said windings A, B and C are all identical, corresponding parts thereof being spaced apart from one another by 120° mechanical around the primary winding circumference.

7. In a single-phase, pole-changing motor, the combination according to claim 6, wherein windings A, B and C are connected together in star and said means for supplying phase-displaced single-phase alternating current to winding C includes a capacitor connected between one pole of an alternating current supply and said winding C.

8. In a single-phase, pole-changing motor, the combination according to claim 5, wherein said primary winding includes the serial combination of the second half of winding A, the second half of winding B, the first half of winding A and the first half of winding B serially connected together, said means for supplying single-phase alternating current thereto comprise means for arranging both said second and both said first winding halves in alternative series and parallel arrangements across a supply of said alternating current, said winding C comprises first and second halves serially connected together at a junction and said means for supplying phase-displaced alternating current thereto includes two capacitors for connection between the two ends of winding C and the two ends of the series combination of windings A and B and further includes means for connecting said junction to the end of windings A and B in the parallel arrangement thereof.

9. A single-phase, pole-changing induction motor comprising the combination according to claim 8 and a squirrel cage rotor.

References Cited by the Examiner
UNITED STATES PATENTS 2,959,721  11/1960  Butler ______________ 318—224
3,070,734  12/1962  Rawcliffe ___________ 318—224

ORIS L. RADER, *Primary Examiner.*